United States Patent [19]
Yui

[11] Patent Number: 5,677,741
[45] Date of Patent: Oct. 14, 1997

[54] IMAGE PROCESSING APPARATUS AND METHOD CAPABLE OF ADJUSTING HUES OF VIDEO SIGNALS IN CONVERSION TO DISPLAY SIGNALS

[75] Inventor: Hideaki Yui, Kawasaki, Japan

[73] Assignee: Canon Kabushiki Kaisha, Tokyo, Japan

[21] Appl. No.: 428,441

[22] Filed: Apr. 25, 1995

[30] Foreign Application Priority Data

Apr. 27, 1994 [JP] Japan .................................. 6-090281
Apr. 20, 1995 [JP] Japan .................................. 7-095201

[51] Int. Cl.$^6$ .......................... H04N 9/64; H04N 9/68
[52] U.S. Cl. .......................... 348/649; 248/651; 248/672; 248/708; 345/150; 345/199
[58] Field of Search ........................... 348/649, 651, 348/656, 658, 671, 672, 675, 708; 358/500, 501, 519, 520, 523; 345/150, 199; 395/131; H04N 9/64, 9/68, 9/69

[56] References Cited

U.S. PATENT DOCUMENTS 5,142,272  8/1992  Kando ............................. 348/649
5,311,297  5/1994  Seki et al. ........................ 348/675
5,406,310  4/1995  Aschenbrenner et al. ........ 345/199

FOREIGN PATENT DOCUMENTS

| 0310388 | 4/1989 | European Pat. Off. . | |
| 0546773 | 6/1993 | European Pat. Off. . | |
| 0590763 | 4/1994 | European Pat. Off. . | |
| 103335 | 4/1993 | Japan ......................... | H04N 9/64 |
| WO9220184 | 11/1992 | WIPO . | |

*Primary Examiner*—Glenton B. Burgess
*Attorney, Agent, or Firm*—Fitzpatrick, Cella, Harper & Scinto

[57] ABSTRACT

An image processing apparatus of this invention has an ordinary displaying mode and a hue conversion mode to change hues in correspondence with a user. In the ordinary displaying mode, input image data is displayed on a display, and in the hue conversion mode, an image for hue conversion is displayed on the display. The hues are converted in accordance with an instruction of the user.

22 Claims, 10 Drawing Sheets

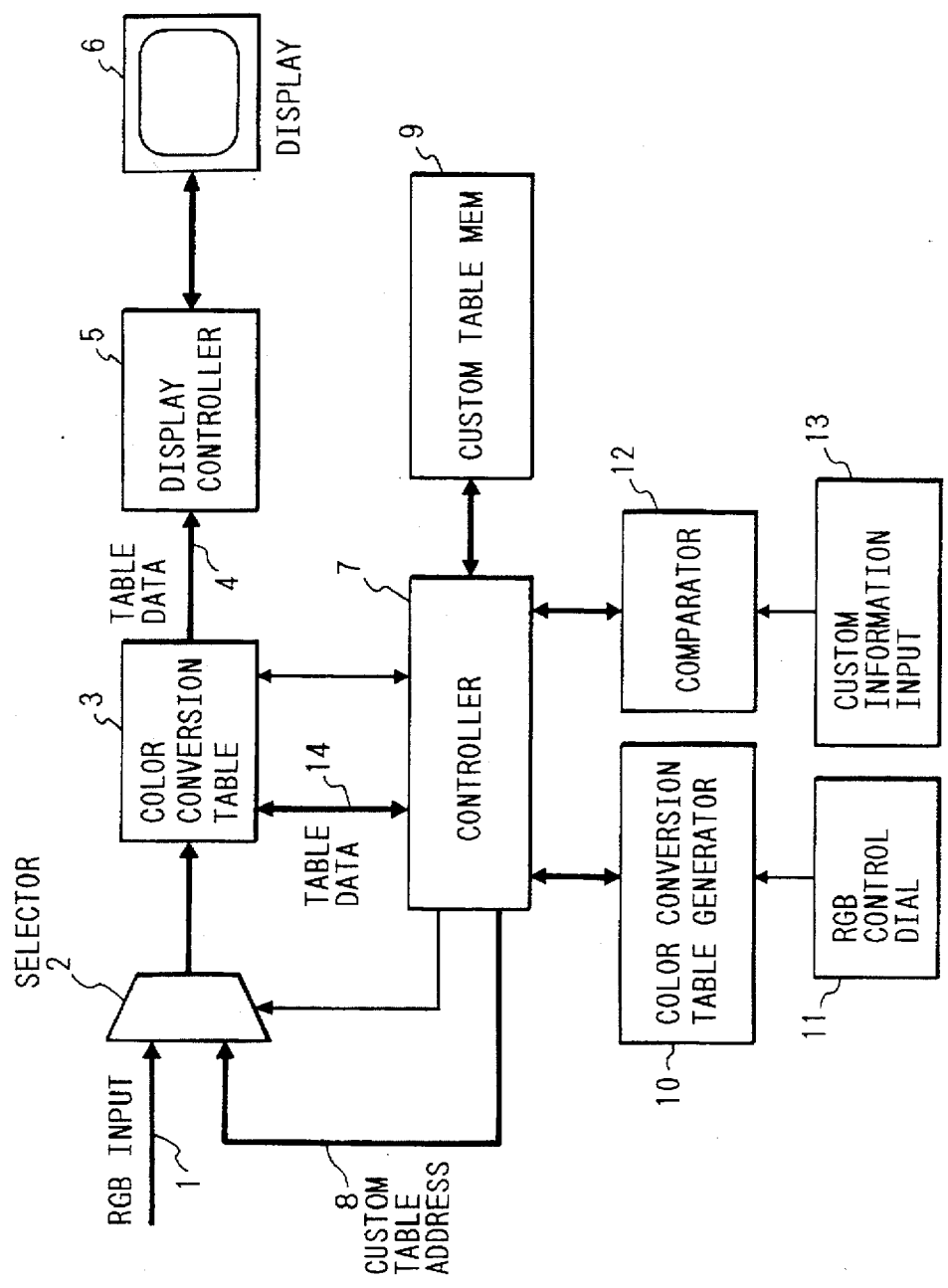

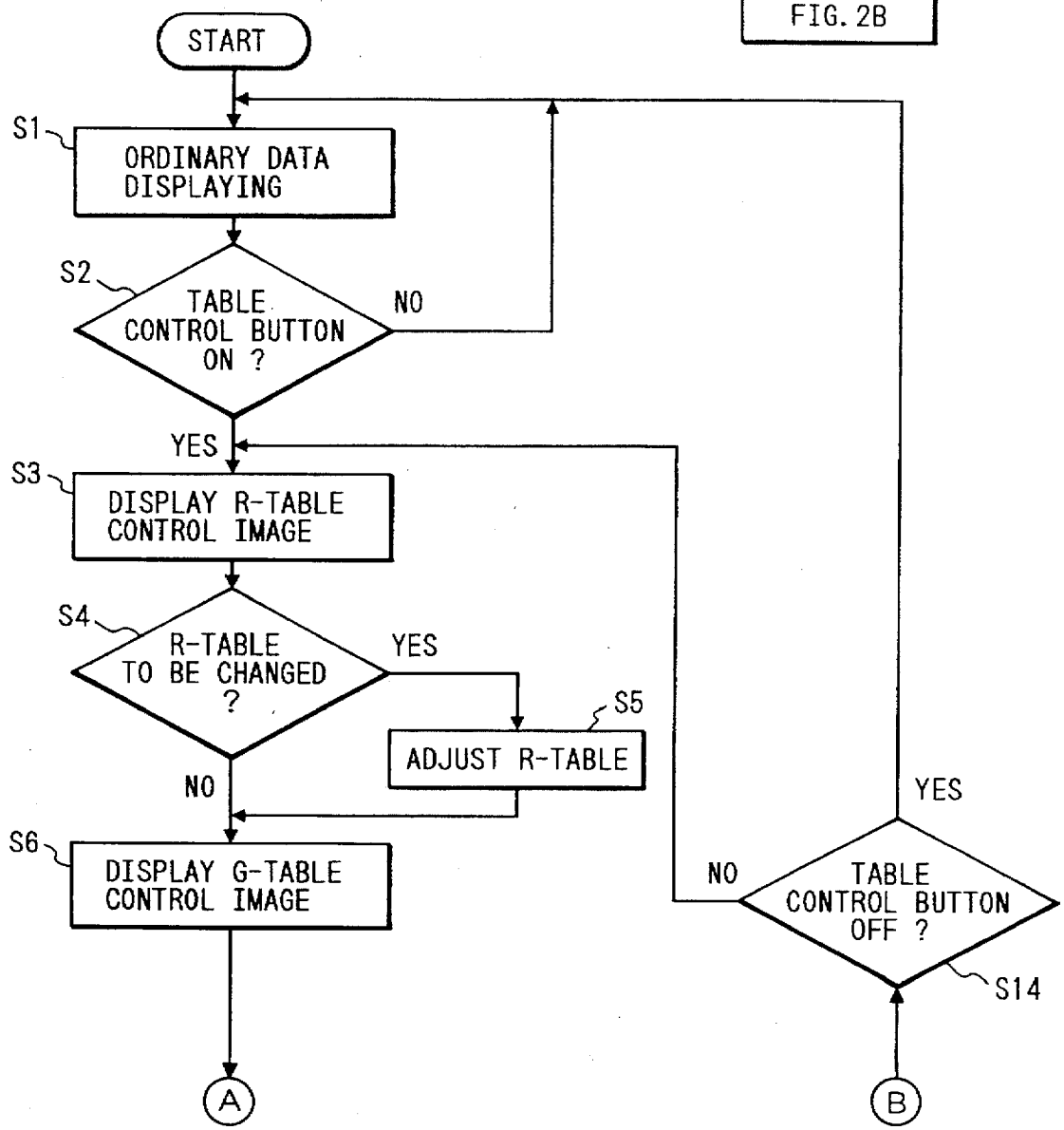

FIG. 6A-1   FIG. 6B-1   FIG. 6C-1
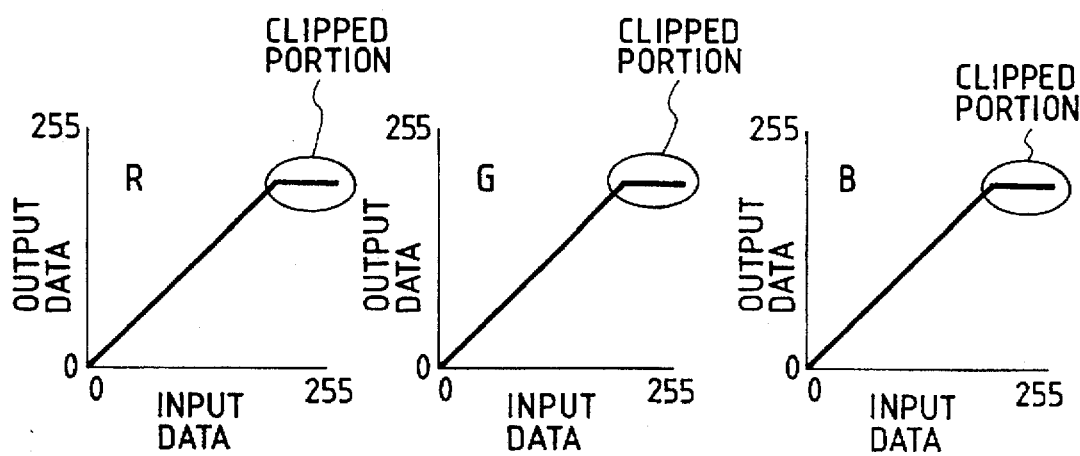
FIG. 6A-2   FIG. 6B-2   FIG. 6C-2
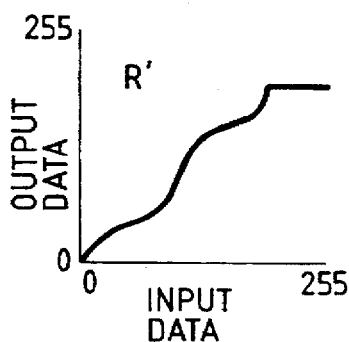 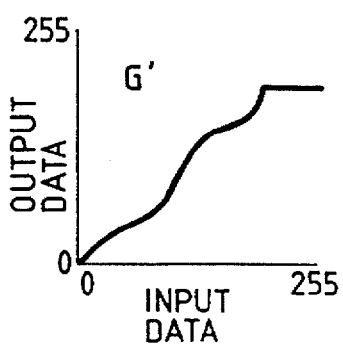 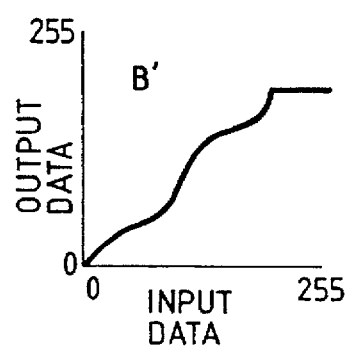

IMAGE PROCESSING APPARATUS AND METHOD CAPABLE OF ADJUSTING HUES OF VIDEO SIGNALS IN CONVERSION TO DISPLAY SIGNALS

BACKGROUND OF THE INVENTION

1. Field of the Invention

The present invention relates to an image processing apparatus and, more particularly, to an image processing apparatus for converting a video signal into a signal for a display panel.

2. Related Background Art

As is conventionally known, the hues of CRT video output signals are determined in correspondence with the statistically determined luminous efficiency (the energy distribution amounts of R, G, and B sensed by the human eyes).

In color digital video signal processing, a series of processing operations such as gamma conversion, color management, and the like, which take the characteristics of an input/output display device and matching to the color reproducibility of color peripheral apparatuses represented by a printer and scanner into account are performed in consideration of the statistically determined visual sense characteristics of normal persons.

However, when the hues are determined in correspondence with the statistically determined luminous efficiency, it is inconvenient for, e.g., red-blind or color-blind persons, or a person who wants to intentionally change hues, resulting in a low degree of freedom. Since it is known that Europeans and Americans tend to be sensitive to red, and Japanese tend to be sensitive to blue, it is often inconvenient to determine the hues in correspondence with the statistically determined luminous efficiency.

SUMMARY OF THE INVENTION

It is an object of the present invention to provide an image processing apparatus which can change hues to solve the above-mentioned problems.

According to the present invention, there is provided an image processing apparatus with a display panel, including a video signal generator for generating a video signal, a color sense converter for color-sense-converting the video signal generated by the video signal generator on the basis of predetermined color sense data, and a signal converter for converting the video signal color-sense-converted by the color sense converter into a signal for the display panel.

According to the present invention, there is also provided an image processing apparatus for converting an input image signal into an output image signal using a color conversion table, including a switch for selecting one of first and second modes, and display controller for displaying an image input by an input device on a display. when the first mode is selected, and displaying information for changing the color conversion table on the display when the second mode is selected.

With the above arrangement, a video signal is generated by the video signal generator, the generated video signal is color-sense-converted by the color sense converter on the basis of color sense data. The converted video signal is converted into a signal for the display panel by the signal converter.

BRIEF DESCRIPTION OF THE DRAWINGS

FIG. 1 is a block diagram of the overall image processing apparatus according to the first embodiment of the present invention;

FIGS. 3A-1 to 3C-2 are views showing the custom conversion processing of R, G, and B input/output characteristics;

FIGS. 6A-1 to 6C-2 are views showing the custom conversion processing of R, G, and B input/output characteristics;

DETAILED DESCRIPTION OF THE PREFERRED EMBODIMENTS

The preferred embodiments of the present invention will be described hereinafter with reference to the accompanying drawings.

(First Embodiment)

Figures 1, 3A, 3B, 3C:
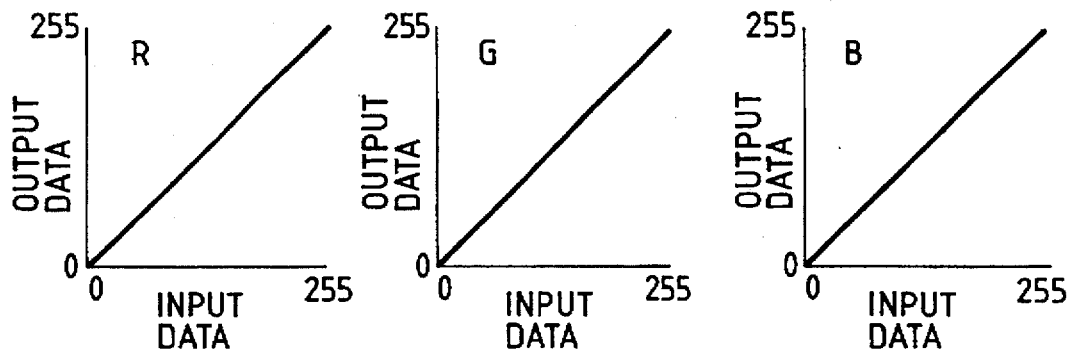

FIG. 1 is a block diagram showing the overall image processing apparatus according to the first embodiment of the present invention.

Referring to FIG. 1, digital R, G, and B input data 1 are supplied from a video signal output terminal of an information processing apparatus such as a work station, a personal computer, or the like. A selector 2 switches between custom table address data 8 supplied from a controller 7, and the digital R, G, and B input data 1. A color conversion table 3 comprises a rewritable RAM which stores color conversion table data 14 supplied from the controller 7, and looks up data (address) supplied from the selector 2 to output table data 4 based on the looked-up data. A display controller 5 controls the display operation of a display 6 as an output display device on the basis of the table data 4 supplied from the color conversion table 3. A color conversion table generator 10 changes setting data of table data on the basis of variable information of an RGB control dial 11 when a user of this apparatus wants to generate custom color conversion data. A custom information input device 13 comprises a keyboard used for inputting the personal ID information of a user of this apparatus, a magnetic card, and the like. A custom table memory 9 is a storage device which stores custom table data generated by the color conversion table generator 10, and comprises, e.g., a hard disk device, a floppy disk device, and the like. A comparator 12 compares the personal ID information input from the custom information input device 13 with the registered contents of the custom table memory 9.

The operation of the first embodiment will be described below. In ordinary image processing of this apparatus, the digital R, G, and B input data 1 are selected by the selector 2, and are supplied to the color conversion table 3 as addresses. Based on the addresses, data, which are pre-stored in the color conversion table and correspond to the input addresses, are output as the table data 4. The table data 4 are converted into a transfer format compatible with the display by the display controller 5, and the converted data are transferred to the display 6 together with a driving control signal. This processing flow is the same as that of ordinary color conversion processing, and it is a common practice to rewrite and change the contents of the color conversion table upon execution of color conversion processing such as inverse gamma correction in correspondence with the characteristics of the connected display. The flow of the above-mentioned ordinary processing takes into account only the visual sense characteristics of average persons, the characteristics of the display, and the like.

Processing for customizing color conversion in units of users as the characteristic feature of the present invention will be explained below.

First, a user generates and registers color conversion table data customized for himself or herself. The processing flow will be explained below with reference to the flow charts shown in FIGS. 2A and 2B.

Figure 2B:
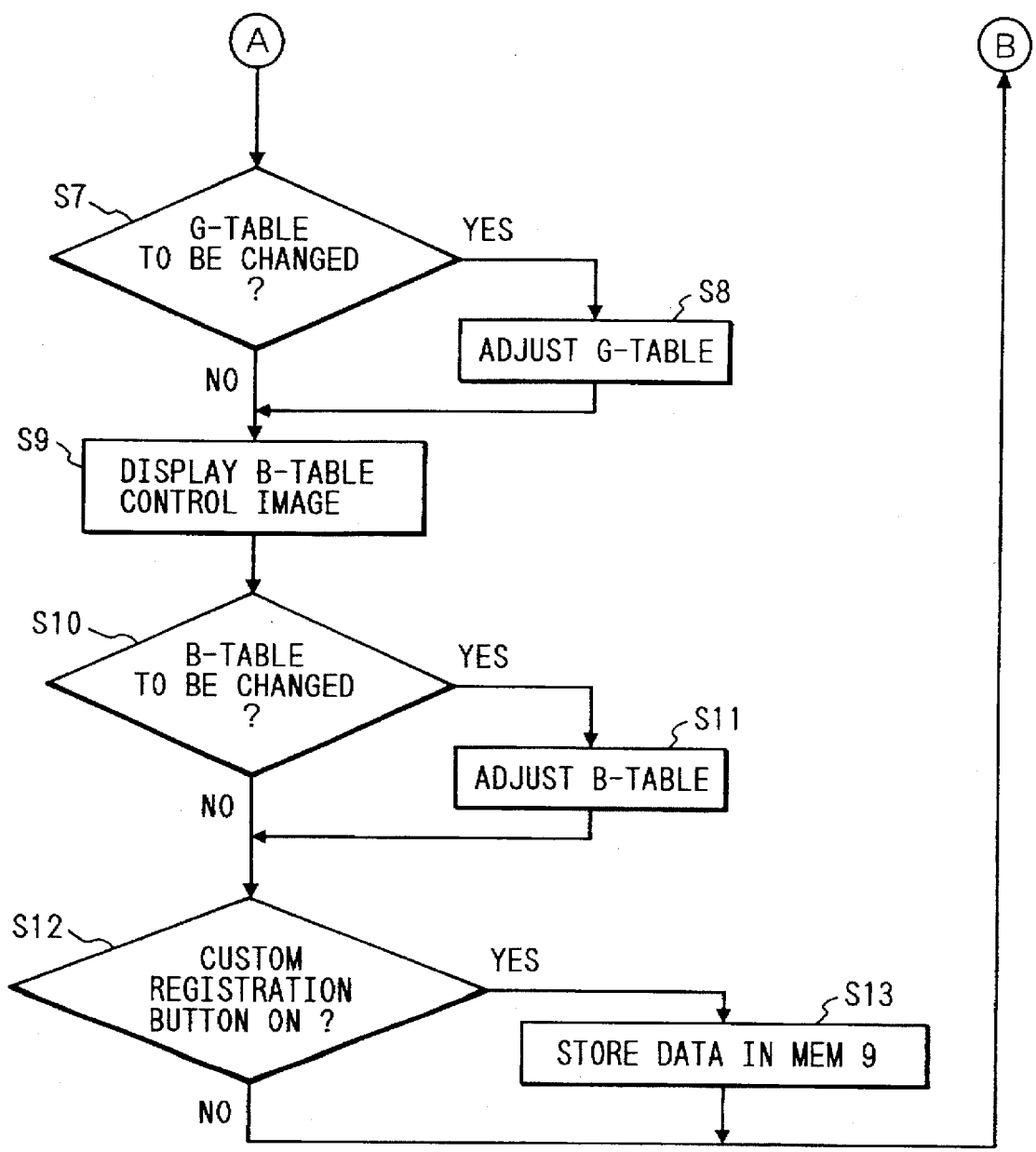
FIG. 2 is comprised of FIG. 2A and FIG. 2B showing flow charts of color table data generation/registration processing in the first embodiment.

FIGS. 2A and 2B are flow charts showing color table data generation/registration processing.

Figures 2, 3A, 3B, 3C:
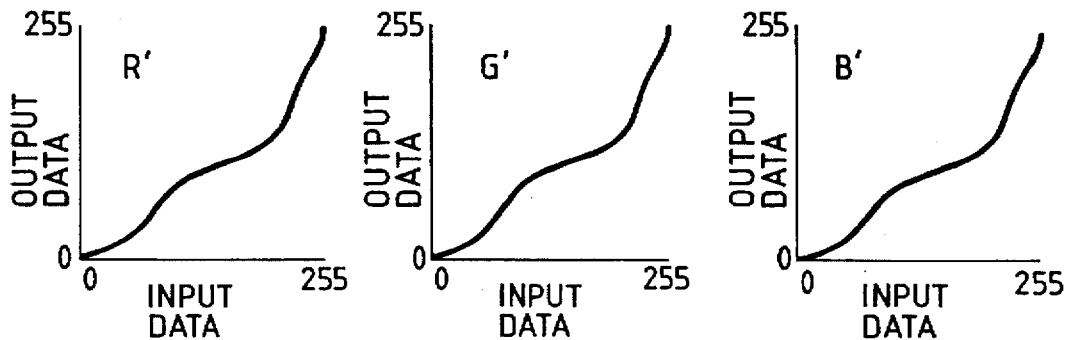

When the above-mentioned ordinary data displaying operation is performed (step S1), the color conversion table generator 10 checks if the user turns on a table control button of the RGB control dial 11 (step S2). If NO in step S2, the ordinary data displaying operation is performed. However, if it is determined in step S2 that the user turns on the table control button, an R-table control image is displayed on the display 6 in step S3. At this time, the color conversion table generator 10 outputs a display request of an R-table control image to the controller 7. Upon reception of this request, the controller 7 switches the selector 2 to the custom table address data 8 side, and reads out an R-scale color bar image as the R-table control image from the custom table memory 9. The R-scale color bar image is displayed on the display 6 via the color conversion table 3 and the display controller 5. At this time, the table data stored in the color conversion table are tuned by the controller 7 to have linear input/output characteristics which can serve as standard data for control, as shown in FIG. 3A-1. It is checked in step S4 if a change request of an R-table is input. If NO in step S4, the flow jumps to step S6. Upon adjustment of the R-table, the user adjusts the RGB control dial 11 while observing the R-scale color bar image displayed on the display 6, thereby changing the characteristics of table data as the user desired. During this adjustment, the contents of the color conversion table 3 can be rewritten by the controller 7 as needed, and the user can perform operations while confirming the adjustment result (effect) on the screen of the display 6. FIG. 3A-2 shows an example of the input/output characteristics of the R-table which are changed by the adjustment. The characteristics of a G-table are also changed from FIG. 3B-1 to FIG. 3B-2 by the same processing (steps S7 and S8), and the characteristics of a B-table are changed from FIG. 3C-1 to FIG. 3C-2 by the same processing (steps S10 and S11). With the above-mentioned processing, all the R, G, and B color conversion table data are customized. If it is determined in step S12 that the user turns on a custom registration button of the RGB control dial 11, the R, G, and B custom table data ad3usted in steps S5, S8, and S11 are stored in the custom table memory 9 in step S13. At this time, the user simultaneously inputs an index ID of the registered data from the custom information input device 13, thus completing registration of custom table data. Subsequently, when the user turns off the table control button of the RGB control dial 11 (step S14), the flow returns to step S1 to resume the ordinary data displaying mode. At this time, the data in the conversion table 3 have already been changed to the latest data (the data adjusted in steps S5, S8, and S11).

Processing for changing the contents of the color conversion table 3 when the user uses this apparatus will be described below.

Referring to FIG. 1, the user inputs personal ID information from the custom information input device 13, and transfers it to the comparator 12. The comparator 12 transfers a comparison request to the controller 7. Upon reception of this request, the controller 7 loads and scans all index IDs of already registered data from the custom table memory 9, and transfers them to the comparator 12. Upon reception of these data, the comparator 12 performs comparison processing. If the comparator 12 cannot find any coincidence, it informs non-coincidence to the user. If a coincidence is found, the comparator 12 outputs a download request to the controller 7 to download the R, G, and B custom table data corresponding to the index ID from the custom table memory 9 to the color conversion table 3.

With the above-mentioned processing, color conversion processing customized in units of users can be realized.

(Second Embodiment)

Figure 4:
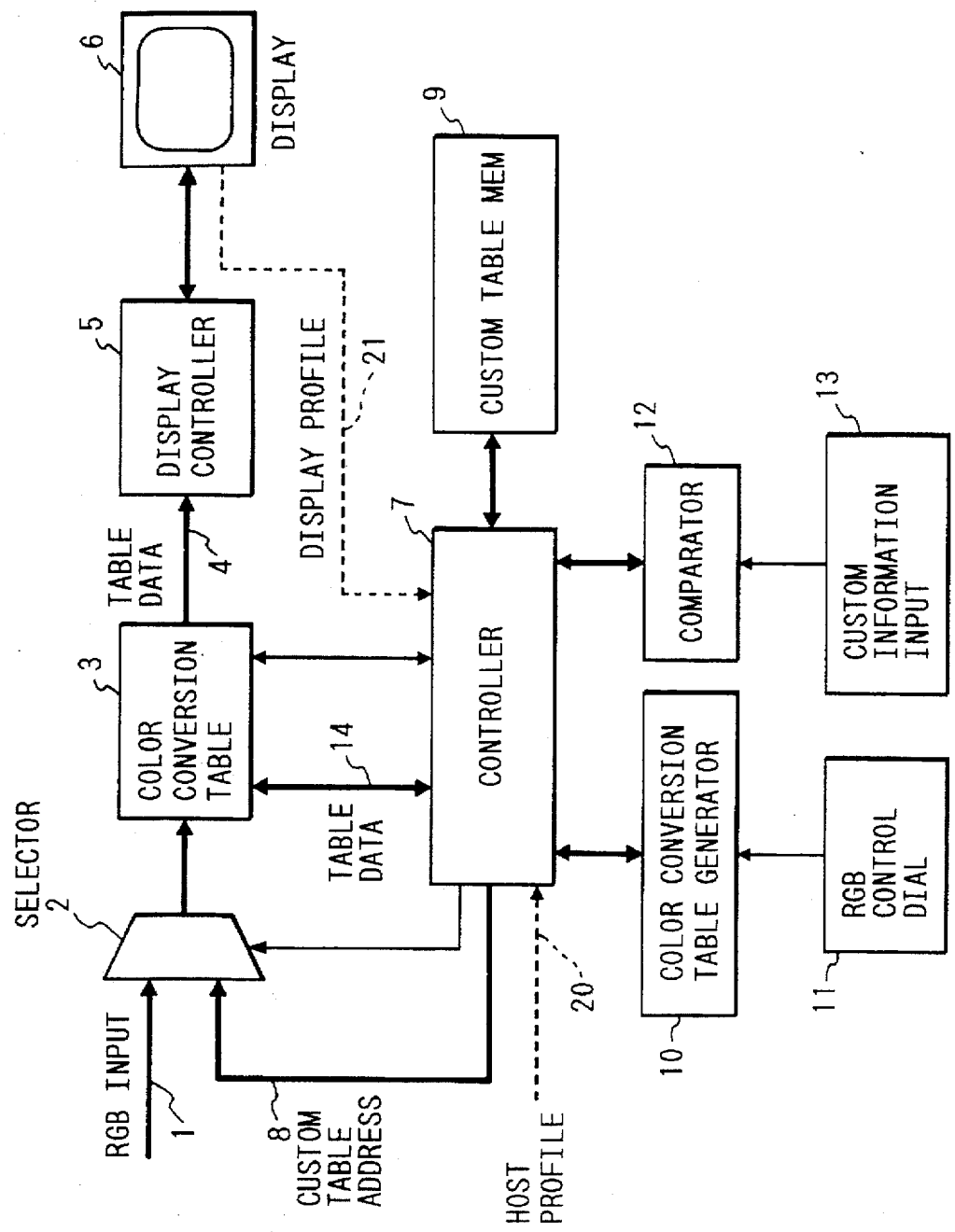
FIG. 4 is a block diagram of the overall image processing apparatus according to the second embodiment of the present invention.

FIG. 4 is a block diagram showing the overall image processing apparatus according to the second embodiment. The apparatus shown in FIG. 4 is substantially the same as that in FIG. 1, except that host profile information 20 and display profile information 21 are input to the controller 7.

Referring to FIG. 4, the host profile information includes color space information of R, G, and B input data which can be reproduced by the host side. The display profile information includes color space information of R, G, and B output data, which can be reproduced by the display side. These two pieces of information are transferred to the controller 7, and the controller 7 executes the following processing.

(1) When Host Color Space=Display Color Space

Figure 5A:
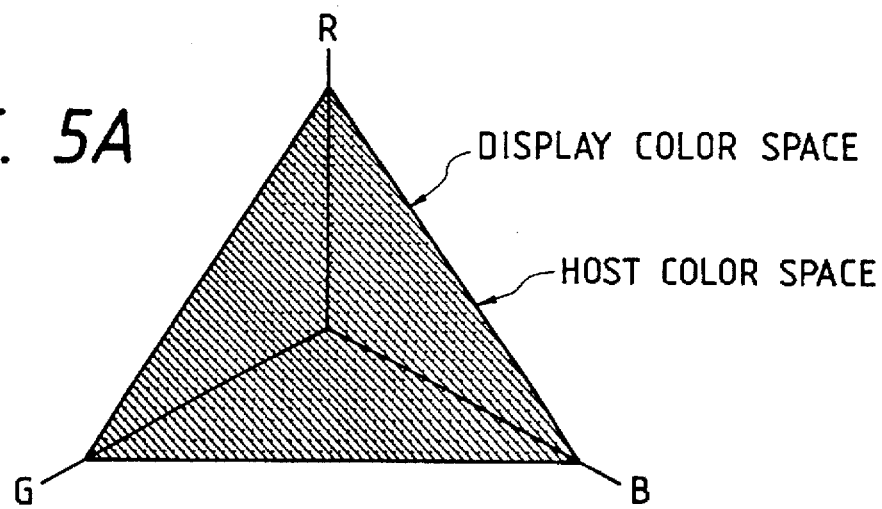
FIGS. 5A to 5C are views showing input and output color spaces in the second embodiment.

FIG. 5A shows a color space in this case.

In this case, it is determined that the host color space is the same as the display color space, and the contents of the color conversion table are customized according to a user's request by the processing of the first embodiment while maintaining the host color space.

(2) When Host Color Space<Display Color Space

Figure 5B:
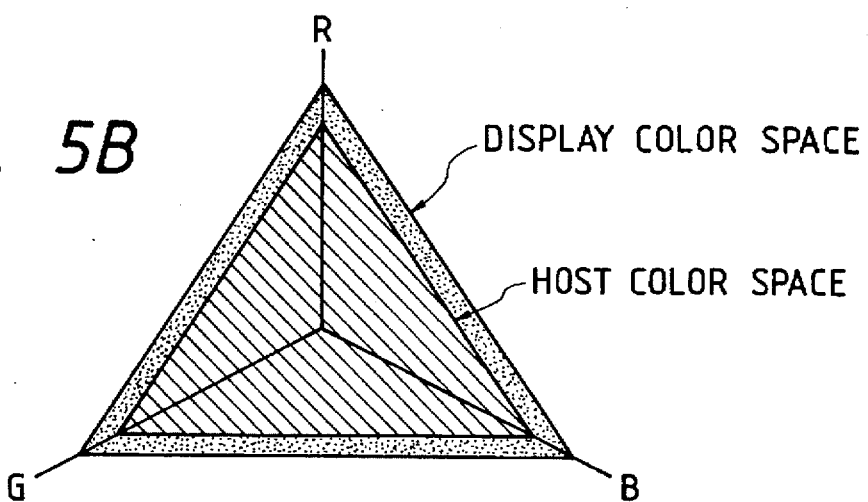

FIG. 5B shows a color space in this case.

In this case, it is determined that the display color space is larger than the host color space (the color space reproducing performance of the display color space is higher than that of the host color space), and the contents of the color conversion table are customized according to a user's request by the processing of the first embodiment while maintaining the host color space.

(3) When Host Color Space>Display Color Space

Figure 5C:
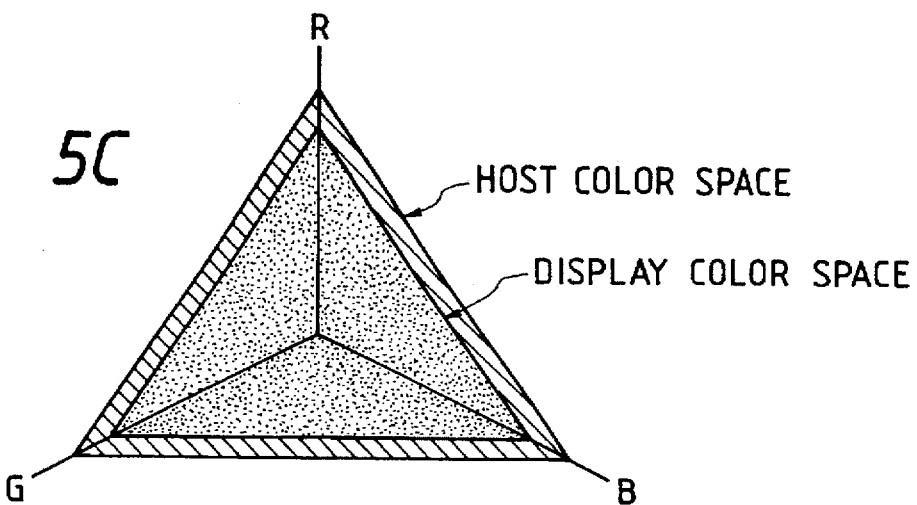

FIG. 5C shows a color space in this case.

In this case, it is determined that the display color space is smaller than the host color space (the color space reproducing performance of the display color space is lower than that of the host color space), and the following clipping processing is performed prior to the custom processing according to a user's request. More specifically, processing for assigning all color space portions, which cannot be reproduced by the display side, to the closest portions in the host color space (clipping processing) is performed. The controller 7 performs the clipping processing, and writes new color conversion data generated after the clipping processing in the color conversion table 3. The input/output characteristics written in the color conversion table 3 are as shown in FIGS. 6A-1, 6B-1, and 6C-1. Upon adjustment of the RGB control dial from this state by the processing of the first embodiment, portions other than the clipped portions are adjusted, and color conversion processing which is optimally customized in consideration of the color reproduction performances of both the host and display sides is performed, as shown in FIGS. 6A-2, 6B-2, and 6C-2.

(Third Embodiment)

Figure 7:
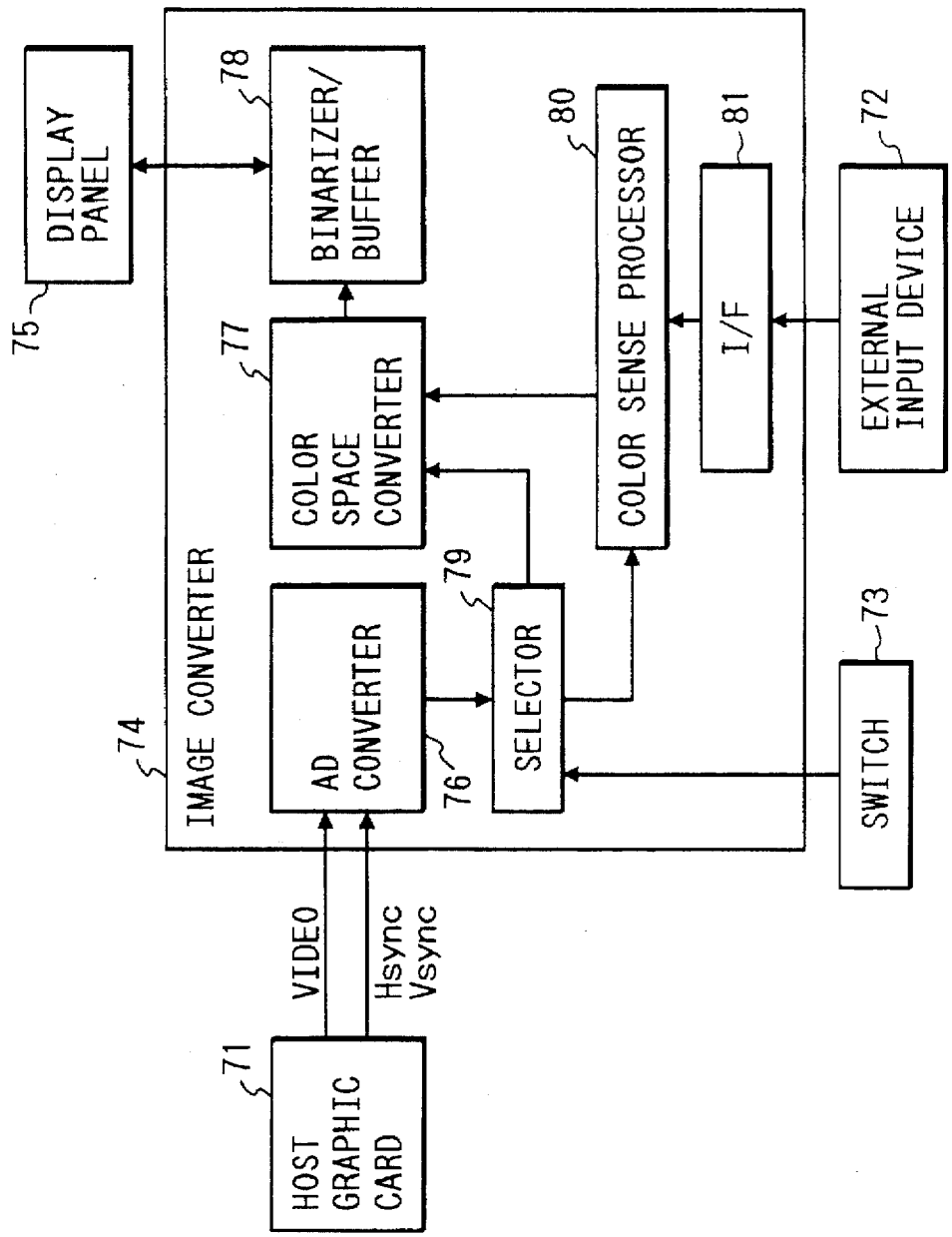
FIG. 7 is a block diagram of the overall image processing apparatus according to the third embodiment of the present invention.

FIG. 7 is a block diagram showing the overall image processing apparatus according to the third embodiment of the present invention.

Referring to FIG. 7, a host graphic card 71 as video signal generation means outputs graphic data generated by an information processing apparatus such as a work station, a personal computer, or the like. An image converter 74 converts an analog video signal VIDEO and horizontal/vertical synchronization signals (Hsync/Vsync) supplied from the host graphic card 71 into signals for a display panel 75.

An external input device 72 as color sense data input means is used for inputting, to the image converter 74, data stored in a storage medium comprising, e.g., a magnetic card, which stores personal color sense (spectral sensitivity) data generated in advance, as described in the first embodiment. A switch 73 is used for selecting one of an ordinary processing mode and a processing mode based on personal color sense data.

The image converter 74 comprises an AD converter 76, a selector 79, a color space converter 77 as signal conversion means, a binarizer/buffer 78, a color sense processor 80 as color sense conversion means, and an external input device interface (I/F) 81.

The AD converter 76 includes an A/D converter, and other circuits, and performs horizontal/vertical timing detection, data extraction, and the like from the analog video signal VIDEO and the horizontal/vertical synchronization signals (Hsync/Vsync) supplied from the host graphic card 71 using synchronization separation and PLL (phase-locked loop), thereby converting input data into an image data format required in the subsequent processing.

The selector 79 connects the output from the AD converter 76 to the color space converter 77 when the processing mode based on color sense data is selected by the switch 73, and connects the output from the AD converter 76 to the color sense processor 80 when the ordinary processing mode is selected by the switch 73.

The color sense processor 80 color-sense-converts a video signal from the selector 79 on the basis of color sense data input from the external input device 82 via the external input device interface 81.

The color space converter 77 performs clipping processing of a video signal from the selector 79 or the color sense processor 80 to a color space optimal to the display panel 75.

The binarizer/buffer 78 performs format conversion and buffering of data with respect to the display panel 75.

Figure 8:
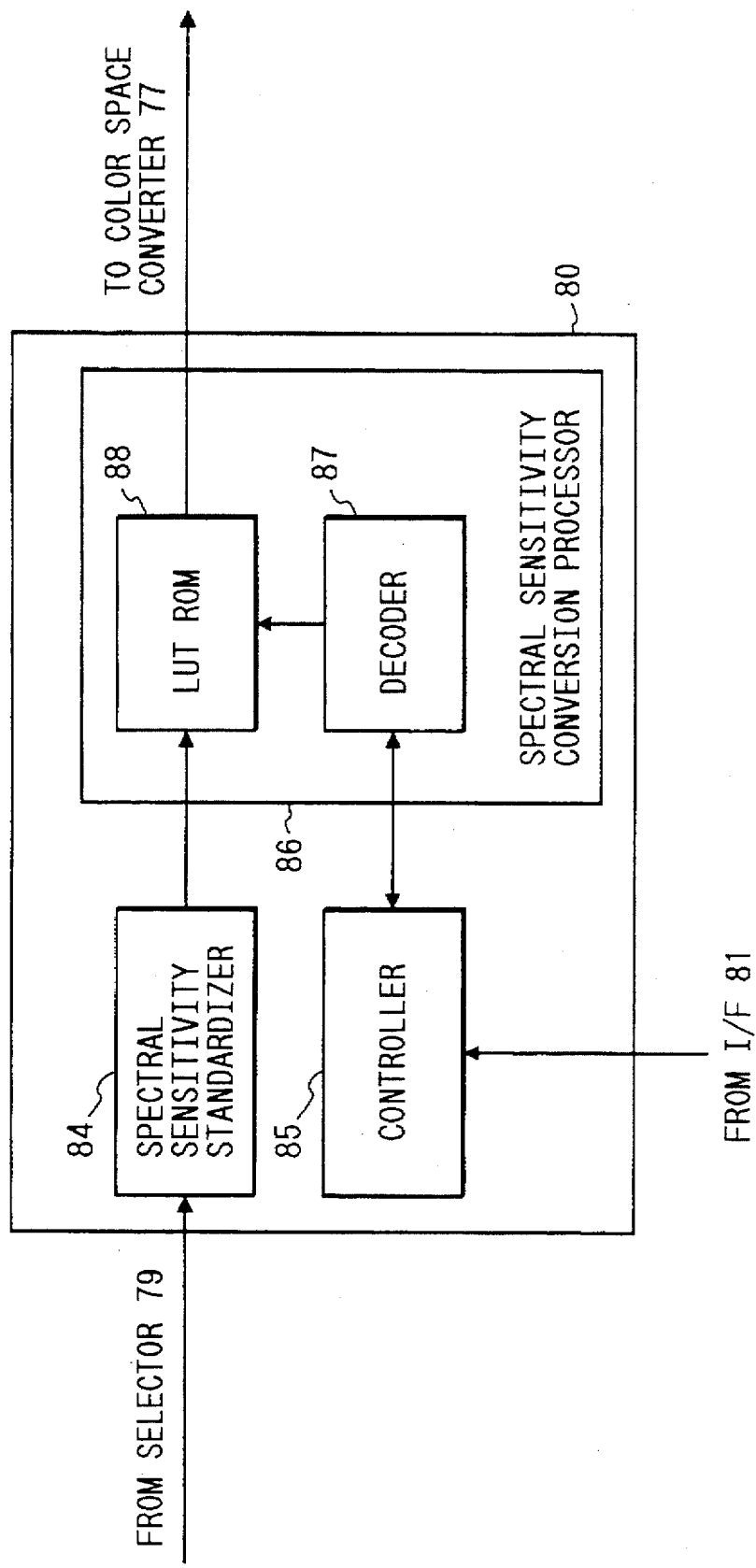
FIG. 8 is a block diagram showing the arrangement of a color sense processor.

FIG. 8 is a block diagram showing the arrangement of the color sense processor 80 shown in FIG. 7.

Referring to FIG. 8, a spectral sensitivity standardizer 84 converts the spectral sensitivity of data into that of average persons to obtain standardized spectral sensitivity data as pre-processing of conversion since the spectral sensitivity of actually input data may be calibrated in correspondence with racial or personal differences.

A controller 85 processes personal spectral sensitivity data read out from the external input device 72 to convert it into control data for spectral sensitivity conversion processing.

A spectral sensitivity conversion processor 86 comprises a look-up table memory (LUT ROM) 88 and a decoder 87. In this processor 86, a control signal from the controller 85 is decoded by the decoder 87, and the LUT ROM 88 is controlled by the output from the decoder 87, thereby generating personal spectral sensitivity data.

The operation of the image processing apparatus of the third embodiment will be described below.

The analog video signal VIDEO and the horizontal/vertical synchronization signals (Hsync/Vsync) supplied from the host graphic card 71 are input to the image converter 74, and are subjected to horizontal/vertical timing detection, data extraction, and the like using synchronization separation and PLL in the AD converter 76. When the switch 73 selects the processing mode based on color sense data, the output from the AD converter 76 is connected to the color space converter 77 by the selector 79; when the ordinary processing mode is selected, the output from the AD converter 76 is connected to the color sense processor 80.

In the ordinary processing mode, the color space converter 77 performs clipping processing to a color space optimal to the display panel 75, the binarizer/buffer 78 performs format conversion and buffering of data with respect to the display panel 75, and the display panel 75 is driven based on the buffered data.

On the other hand, in the processing mode based on color sense data, the color sense processor 80 color-sense-converts the video signal on the basis of personal color sense data stored in the storage medium of the external input device 72. The color space converter 77 performs clipping processing of the converted video signal to a color space optimal to the display panel 75, the binarizer/buffer 78 performs format conversion of data with respect to the display panel 75, and the display panel 75 is driven based on buffered data.

(Fourth Embodiment)

Figure 9:
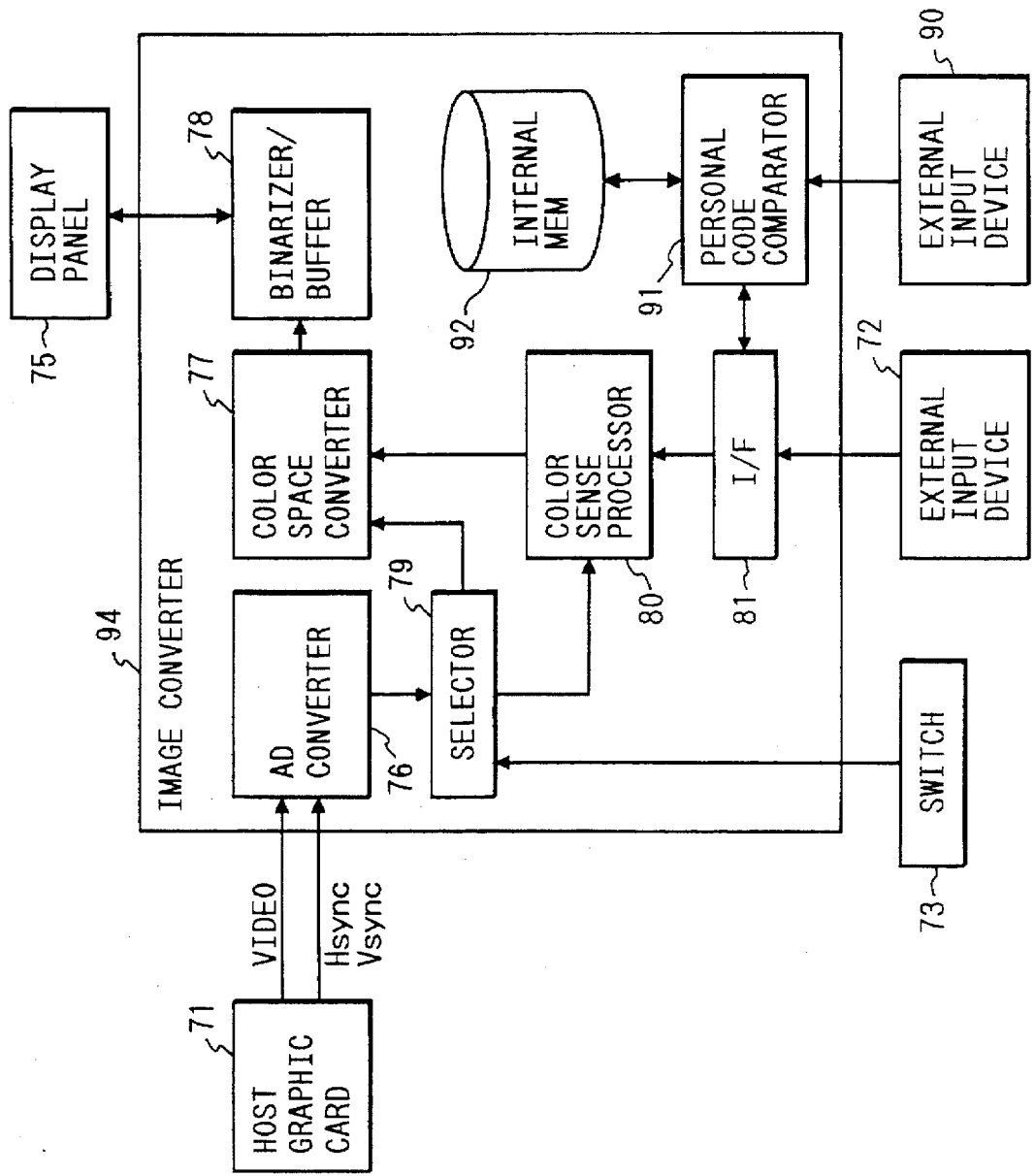
FIG. 9 is a block diagram of the overall image processing apparatus according to the fourth embodiment of the present invention.

FIG. 9 is a block diagram showing the overall image processing apparatus according to the fourth embodiment of the present invention. The same reference numerals in FIG. 9 denote the same parts as in FIG. 7.

An image converter 94 comprises an AD converter 76, a selector 79, a color space converter 77, a binarizer/buffer 78, a color sense processor 80, an external input device interface 81, a personal code comparator 91 as searching means, and an internal memory 92 as storage means. The image converter 94 is electrically connected to a host graphic card 71, a display panel 75, an external input device 72, and a switch 73 as in the image converter 74 shown in FIG. 7.

An external input device 90 as identification data input means comprises, e.g., a ten-key pad, and is used for inputting a user code to the personal code comparator 91.

This embodiment is different from the third embodiment in the following points. More specifically, in this embodiment, when a user who initially uses the system inputs personal spectral sensitivity data from the external input device 72 and inputs a user code from the external input device 90, the personal code comparator 91 stores the personal spectral sensitivity data in the internal memory 92 in correspondence with the user code.

Also, in this embodiment, when a user inputs only a user code from the external input device 90, the personal code comparator 91 searches the internal memory 92. When the comparator 91 finds the input user code, personal spectral sensitivity data corresponding to the input user code is read out, and the readout personal spectral sensitivity data is input to the color sense processor 80 via the external input device interface 81.

As described above, according to this embodiment, a system user need not perform calibration using personal color sense data each time he or she uses the system, and the operability of the user environment can be improved for a plurality of users who share a single system.

Since the means for inputting a user code and the means for searching the contents of a registration database are arranged, the color sense data of a user himself or herself are not exposed to a third party, thus improving the confidentiality of personal information.

Even for users having color senses different from the statistically determined color sense data, an output image optimized for each user can be obtained.

Since data input/output color spaces are looked up, and matching processing is attained by optimal clipping processing based the looked-up color spaces as pre-processing of custom data calibration, a system user can perform customized color conversion of the connected environment of a color system with optimal color reproducibility.

What is claimed is:

1. An image processing apparatus comprising:
    signal conversion means for converting an input image signal into an output image signal using a color conversion table;
    switching means for selecting one of first and second modes;
    display means for displaying an image; and
    display control means for controlling said display means to display an image based on the output image signal when the first mode is selected by said switching means, and to display information for changing the color conversion table when the second mode is selected by said switching means.

2. An image processing method comprising the steps of:
    converting an input image signal into an output image signal using a color conversion table;
    selecting one of first and second modes on the basis of an instruction from input means;
    displaying an image based on the output image signal on display means when the first mode is selected, and displaying information for changing the color conversion table on the display means when the second mode is selected; and
    displaying an image based on the output image signal using the changed color conversion table.

3. An apparatus according to claim 1, wherein said display control means displays the information in each of red, green, and blue colors.

4. An apparatus according to claim 3, wherein said display control means displays the information as a graph.

5. An apparatus according to claim 3, wherein said display control means displays the information in the sequential order of red, green, and blue colors.

6. An apparatus according to claim 3, further comprising adjustment means for adjusting the information displayed in each of red, green, and blue colors by said display control means and storage means for storing the information adjusted by said adjustment means and index information for the adjusted information.

7. An apparatus according to claim 6, wherein said storage means comprises a card-type storage medium.

8. A method according to claim 2, wherein said second displaying step comprises displaying the information in each of red, green, and blue colors.

9. A method according to claim 8, wherein said second displaying step comprises displaying the information as a graph.

10. A method according to claim 8, wherein said second displaying step comprises displaying the information in the sequential order of red, green, and blue colors.

11. A method according to claim 8, further comprising the step of adjusting the information displayed in each of red, green, and blue colors in said second displaying step and the step of storing the information adjusted in said adjusting step and index information for the adjusted information.

12. A method according to claim 11, wherein said storing step stores the adjusted information and the index information in a card-type storage medium.

13. An apparatus according to claim 1, further comprising means for inputting the input image signal to said signal conversion means.

14. An apparatus according to claim 13, wherein said input means comprises a host computer.

15. An image processing method according to claim 2, further comprising the step of providing input means for inputting the input image signal to be converted.

16. An image processing method according to claim 15, further comprising the step of providing a host computer as the input means.

17. An image processing apparatus comprising:
    conversion means for converting a plurality of color data using respective color conversion tables;
    display means for displaying an image;
    first display control means for controlling said display means to display image data based on the plurality of color data;
    second display control means for controlling said display means to display a plurality of pieces of information for changing the respective color conversion tables;
    changing means for changing the plurality of pieces of information displayed on said display means; and
    update means for updating the color conversion tables based on the respective pieces of information changed by said changing means.

18. An image processing apparatus according to claim 17, further comprising input means for inputting the color data.

19. An image processing apparatus according to claim 18, wherein said input means comprises a host computer.

20. An image processing method comprising the steps of:
    converting a plurality of color data using respective color conversion tables;
    controlling display means to display image data based on the plurality of color data;
    controlling the display means to display a plurality of pieces of information for changing the respective color conversion tables;
    changing the plurality of pieces of information displayed on the display means; and
    updating the color conversion tables based on the respective pieces of information changed.

21. An image processing method according to claim 20, further comprising the step of providing input means for inputting the color data.

22. An image processing method according to claim 21, further comprising the step of providing a host computer as the input means.

* * * * *

UNITED STATES PATENT AND TRADEMARK OFFICE
CERTIFICATE OF CORRECTION

PATENT NO. : 5,677,741
DATED : October 14, 1997
INVENTOR(S) : Yui

It is certified that error appears in the above-identified patent and that said Letters Patent is hereby corrected as shown below:

COLUMN 1:

Line 30, "and" should read --and the--.
Line 53, "display." should read --display--.

COLUMN 2:

Line 44, "(address)" should read --(addresses)--.

COLUMN 3:

Line 61, "ad3usted" should read --adjusted--.

COLUMN 7:

Line 23, "based" should read --based on--.
Line 58, "control means" should be deleted.

Signed and Sealed this

Eleventh Day of August 1998

Attest:

Attesting Officer

BRUCE LEHMAN

Commissioner of Patents and Trademarks